UNITED STATES PATENT OFFICE 2,532,762

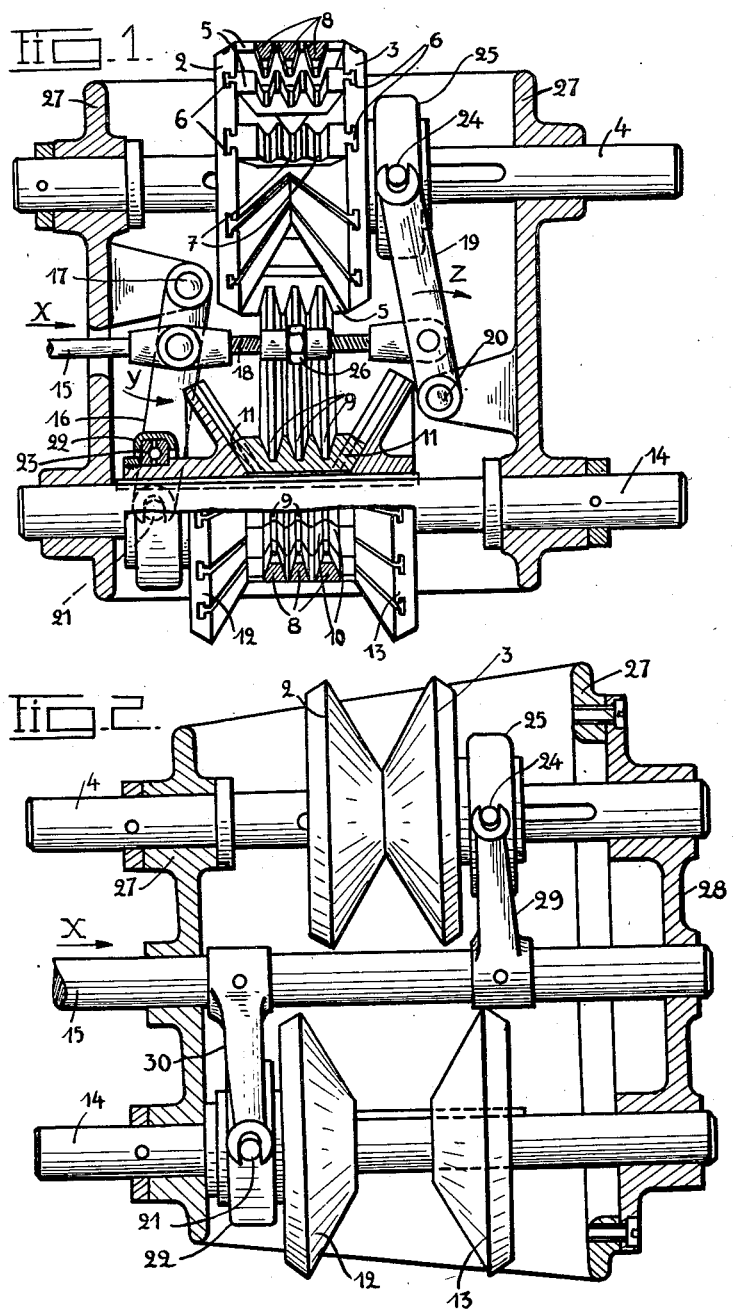

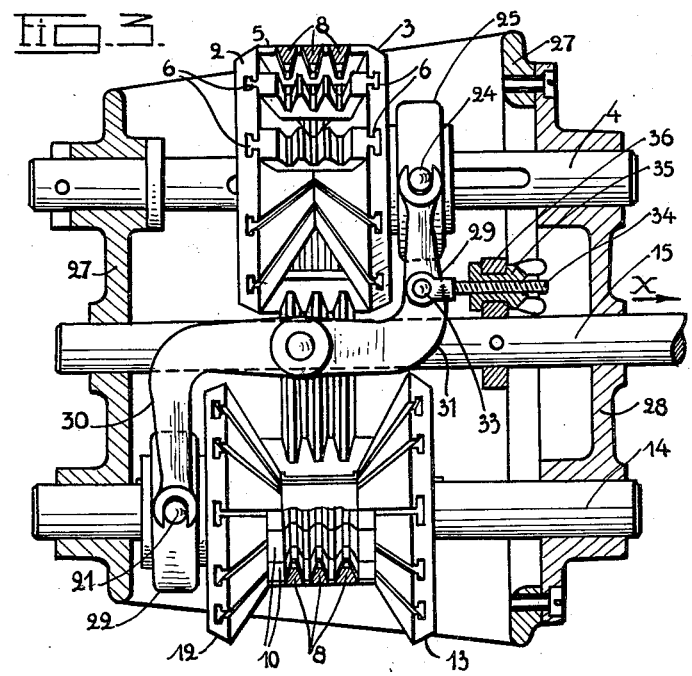
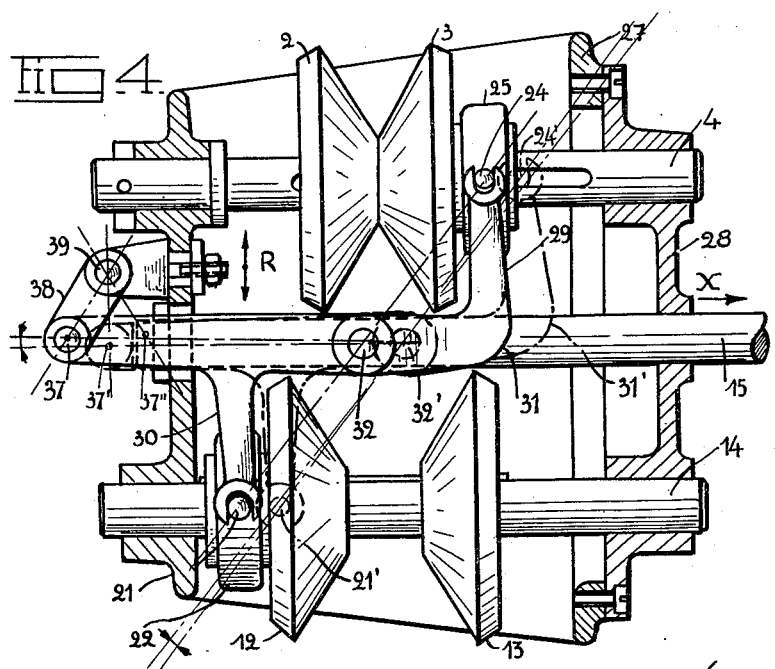

SPEED VARIATOR

Emile Deletaille, Woluwe-St. Pierre, Belgium

Application January 28, 1947, Serial No. 724,813
In Belgium March 22, 1943

Section 1, Public Law 690, August 8, 1946
Patent expires March 22, 1963

4 Claims. (Cl. 74—230.17)

The present invention is relating to a variable-speed gearing or speed variator comprising a pair of coaxial conical discs facing each other at a variable mutual distance, the rotation movement of which is transmitted by at least one belt to another pair of conical discs of the same kind, the mutual distance of which can, at any time, be modified of a proportional amount in a direction opposite to that adopted at the time under consideration for the first pair of conical discs, thanks to a mechanical connection between the movable discs of both pairs.

In the known speed variators of this type, the two conical discs of each pair are mobile in directions opposite to each other.

The present invention has for its object to simplify the manoeuvre of distance variation between the discs.

To this end in the speed variator according to the invention, each pair of conical discs comprises only one axially movable disc which is disposed on the side opposite to that where the movable disc of the other pair is located and which is connected to this disc by such a mechanical connection that both mobile discs are simultaneously moved in the same direction to cause the discs of a pair to move towards each other and the discs of the other pair to move away from each other and inversely.

According to a special form of construction, each axially movable disc is connected to a pivoting arm which is connected by means of a link to the pivoting arm corresponding to the movable disc of the other pair.

In order to make it possible to regulate the tension of the belt, especially to take up the wear of the latter, it is provided to make the length of the above-said link adjustable.

According to another form of construction, each axially movable disc is connected to an arm movable in translation with a rod which can slide parallelly to the rotation axis of the discs.

In this case, said arms are advantageously parts of a lever pivoted with respect to said rod which is located between both pairs of discs, said lever having its angular position adjustable with respect to the rod bearing it.

According to a third form of construction, each axially movable disc is connected to an arm forming a part of a lever pivoted with respect to a rod which can slide between the rotation axes of the discs parallelly to these axes, said lever having one of its points guided in such a manner that during the translation movement of its pivot mounted on the sliding rod in one direction or in the other from its mean position which corresponds to the equality of the winding radiuses of the belt on both pairs of discs, said lever oscillates in the direction tending to maintain constant the tension of the belt.

Especially, the guiding of the above-said point of the pivoted lever can be obtained by articulating this point to a pivoting arm, the pivot of which is at the center of a circumference passing by the positions the above-said guided point must assume for the mean position and for each of the extreme positions of the axially movable discs, in order that the tension of the belt remains constant for these three positions.

Whatever may be the form of construction adopted, it is advantageous to mount the speed variator according to the invention opposite to a removable flange to which no part of the speed variator proper is fastened, so that after its removal of this flange, free access is obtained to the conical discs in view of the eventual easy change of the belt.

Other peculiarities and details of the invention will appear in the course of the description of the accompanying drawings which represent diagrammatically by way of example only some forms of construction of a speed variator according to the invention.

Figure 1 is a view of a first form of construction of the speed variator according to the invention, certain parts of which are represented in section and others, which are not useful to the understanding of the invention, are not represented.

Figs. 2 to 4 represent in a similar manner other forms of construction of the speed variator according to the invention.

Like characters of reference refer to like parts in the several figures.

Figure 1 shows a speed variator comprising a pair of conical discs 2 and 3 driven in rotation by a shaft 4. These discs are so assembled that their distance can vary. When this distance is varied, bars 5, the extremities in form of tenon 6 of which are engaged in dovetailed grooves directed along the generatrices of the frustums of cone, move away from or towards the rotation axis of the discs, according to the direction of the variation of the distance between the latter. In view to simplify the drawings, only some of the bars 5 and of the dovetailed grooves in which the tenons 6 are engaged are represented.

The bars 5 present notches 7 able to accommodate trapezoidal belts 8 which are lodged also in corresponding notches 9 formed in bars 10, the extremities in form of tenon 11 of which can slide in dovetailed grooves along the generatrices of conical surfaces of two other discs 12 and 13, the mutual distance of which can also be varied.

In order to simplify the drawings, only some of the bars 10 and of the dovetailed grooves in which the tenons 11 are engaged are represented. These discs are keyed on a shaft 14 which must be able to rotate at a variable speed for a constant speed of the driving shaft 4 when the distance between the discs 2 and 3 and between the discs 12 and 13 is caused to vary.

When the distance between the discs 2 and 3 is caused to vary, the distance between the discs 12 and 13 is, at every moment, modified of a proportional amount in a direction opposite to that adopted at the moment under consideration for the first pair of discs. This variation of the distance between the discs of the two pairs is operated in Figure 1 as follows: if, from the represented position of the elements, a rod 15 is moved in the direction of the arrow X, a pivoting arm 16 is swung in the direction of the arrow Y around its pivot 17. This pivoting arm is connected by a link 18 to a pivoting arm 19 having its pivot at 20. This pivoting arm 19 pivots thus in the direction of the arrow Z. The pivoting arm 16 is connected by means of a stud 21 to a cup 22 comprising a ball bearing 23 which provokes the axial movement of the disc 12 towards the disc 13 which remains axially immovable. The arm 19 is connected by means of a stud 24 to a cup 25 comprising another ball bearing, not shown in the drawing, which moves the disc 3 away from the disc 2 which remains axially immovable. By suitably choosing the length of the pivoting arms 16 and 19, it is possible to obtain proportional displacements of the discs 12 and 13 according to the ratio it is desired to obtain between the rotation speed of the shafts 4 and 14. As the disc 12 is disposed on the side opposite to that where the disc 3 is, the movement of these discs in the same direction has the effect that the discs of one pair are moved towards each other and the discs of the other pair are moved away from each other, and inversely.

In order to adjust the tension of the belt, eventually to take up the wear of the latter, it is provided to make the link 18 of adjustable length. This link is constituted e. g. of two rods threaded in opposite directions on which a nut 26 with corresponding threads is engaged.

The shafts 4 and 14 pass in a carter 27 which bears also the pivots 17 and 20.

In order to facilitate the occasional change of a worn belt, it is advantageous to arrange the speed variator so that it faces a flange 28 removable from the carter 27 (Fig. 2). However, this flange 28 is not fastened at any part of the variator proper, so that after its removal the access to the conical discs in view of the easy eventual replacement of a belt is free.

To this end, in the speed variator according to Figure 2, each axially movable disc 3 and 12 is connected to an arm indicated respectively by 29 and 30, movable in translation with the rod 15 which can slide parallelly to the rotation axis of the discs.

In order to simplify the drawing, the belt providing for the transmission of the movement from one pair of discs to the other is not shown.

In the embodiment shown in Figure 3, the arms 29 and 30 are parts of a lever 31 pivoted at 32 on the sliding rod 15. The angular position of this lever 31 is adjustable with respect to the rod 15. To this end, this lever is connected by an articulation 33 to a threaded rod 34 engaged in a nut 35 rotatable but so inserted in a collar 36 fixed to the sliding rod 15, that said nut cannot be moved axially with respect to said rod.

Thanks to the adjusting of the angular position of the lever 31, the tension of the belt can be adjusted.

Figure 4 shows a speed variator wherein the lever 31 has one of its points 37 articulated to a pivoting arm 38 having its pivot 39 at the center of a circumference passing by the positions the point 37 must assume for the mean position 37' and for each of the extreme positions 37 and 37" corresponding to the extreme positions of the axially movable discs 3 and 12.

In Figure 4, the mean position of the lever 31 is shown in dot-and-dash lines. As it can be appreciated, the direction 32'—37' forms an angle with the direction 32—37. The same occurs for the direction 32'—24' with the direction 32—24 and for the direction 32'—21' with the direction 32—21.

The mean position of the lever makes an angle of the same kind with the other extreme position in which the point 37 is at 37". The oscillation of the lever 31 on either side of its position shown in dot-and-dash lines at 31', tends to maintain the tension of the belt constant.

It could be demonstrated by calculation that in order that this tension be strictly constant, the point 37 would have to describe a parabola, the parameter of which would depend on certain constructional arrangements adapted. In practice the arc of a circle 37, 37', 37" passing by both extreme positions and by the mean position of the point 37 approximates sufficiently this parabola so that it may be estimated that the tension of the belt does not vary in a prohibitive manner in the course of the speed variation permitted by the speed variator.

In order to adjust the initial tension of the belt, it is provided to make the position of the pivot 39 of the pivoting arm 38 adjustable in the direction indicated by the double arrow R, i. e. perpendicularly to the sliding movement of the rod 15.

It is obvious that the invention is not exclusively restricted to the forms of construction shown and that many modifications may be made in the shape, arrangement and constitution of certain of the elements used in its construction, provided these modifications are not in contradiction with the matter of any of the appended claims.

What I claim is:

1. A speed variator comprising a driving shaft, a first pair of coaxial conical discs at a variable mutual distance mounted on said driving shaft so as to be driven in rotation by the latter, a second pair of coaxial conical discs at a variable mutual distance, a driven shaft parallel to the driving shaft and which is driven in rotation by said second pair of discs, a flexible band passing from one pair of discs to the other for transmitting the rotation of the driving shaft to the driven one, arms located on the opposite sides of the flexible band, means for connecting said arms to the adjacent conical discs in such a manner as to displace the latter along their shaft if said arms are displaced parallel to the latter, a pivoting lever with which said arms are integral and the pivot of which is movable in a direction parallel to the shafts, said pivot being moreover situated at the same distance from said shafts and at the same distance from the points of connection of said arms to the adjacent conical discs, means for displacing said pivot in a direction parallel to the shafts, and means for adjusting the angular position of said lever.

2. A speed variator comprising a driving shaft, a first pair of coaxial conical discs at a variable mutual distance mounted on said driving shaft so as to be driven in rotation by the latter, a second pair of coaxial conical discs at a variable mutual distance, a driven shaft parallel to the driving shaft and which is driven in rotation by said second pair of discs, a flexible band passing from one pair of discs to the other for transmitting the rotation of the driving shaft to the driven one, arms located on the opposite sides of the flexible band, means for connecting said arms to the adjacent conical discs in such a manner as to displace the latter along their shaft if said arms are displaced parallel to the latter, a pivoting lever with which said arms are integral and the pivot of which is movable in a direction parallel to the shafts, said pivot being moreover situated at the same distance from said shafts and at the same distance from the points of connection of said arms to the adjacent conical discs, means for displacing said pivot in a direction parallel to the shafts, a threaded rod pivoted with respect to said lever, and a nut in which this threaded rod is engaged, this nut being mounted so that it can be rotated about its axis but that it is axially immovable with respect to said pivot.

3. A speed variator comprising a driving shaft, a first pair of coaxial conical discs at a variable mutual distance mounted on said driving shaft so as to be driven in rotation by the latter, a second pair of coaxial conical discs at a variable mutual distance, a driven shaft parallel to the driving shaft and which is driven in rotation by said second pair of discs, a flexible band passing from one pair of discs to the other for transmitting the rotation of the driving shaft to the driven one, arms located on the opposite sides of the flexible band, means for connecting said arms to the adjacent conical discs in such a manner as to displace the latter along their shaft if said arms are displaced parallel to the latter, a pivoting lever with which said arms are integral and the pivot of which is movable in a direction parallel to the shafts, said pivot being moreover situated at the same distance from said shafts and at the same distance from the points of connection of said arms to the adjacent conical discs, means for displacing said pivot in a direction parallel to the shafts, a guide for a point of said pivoting lever such that in the course of the translation movement of the pivot of the latter from its means position which corresponds to the equality of the winding radii of the flexible band on both pairs of discs, said pivoting lever oscillates in the direction tending to maintain the tension of the band constant, and means for adjusting the angular position of said lever for the mean position of its pivot.

4. A speed variator comprising a driving shaft, a first pair of coaxial conical discs at a variable mutual distance mounted on said driving shaft so as to be driven in rotation by the latter, a second pair of coaxial conical discs at a variable mutual distance, a driven shaft parallel to the driving shaft and which is driven in rotation by said second pair of discs, a flexible band passing from one pair of discs to the other for transmitting the rotation of the driving shaft to the driven one, arms located on the opposite sides of the flexible band, means for connecting said arms to the adjacent conical discs in such a manner as to displace the latter along their shaft if said arms are displaced parallel to the latter, a pivoting lever with which said arms are integral and the pivot of which is movable in a direction parallel to the shafts, said pivot being moreover situated at the same distance from said shafts and at the same distance from the points of connection of said arms to the adjacent conical discs, means for displacing said pivot in a direction parallel to the shafts, a pivoting arm having its pivot at the center of a circumference passing by the position that its articulation point with the pivoting lever must assume for the mean position and for each of the extreme positions of the pivot of the pivoting lever, and means for adjusting the position of the pivot of said pivoting arm in the direction perpendicular to the direction of said shafts.

EMILE DELETAILLE.

REFERENCES CITED

The following references are of record in the file of this patent:

UNITED STATES PATENTS

| Number | Name | Date |
|---|---|---|
| 1,993,547 | Heyer | Mar. 5, 1935 |
| 2,109,247 | Clay | Feb. 22, 1938 |
| 2,245,667 | Heyer | June 17, 1941 |
| 2,262,782 | Strom | Nov. 18, 1941 |
| 2,266,687 | Keller | Dec. 16, 1941 |
| 2,329,911 | Keller | Sept. 21, 1943 |

FOREIGN PATENTS

| Number | Country | Date |
|---|---|---|
| 231,669 | Great Britain | Apr. 9, 1924 |